US009672242B2

(12) United States Patent
Jung et al.

(10) Patent No.: US 9,672,242 B2
(45) Date of Patent: Jun. 6, 2017

(54) SYSTEM FOR AUTOMATICALLY DETECTING ABNORMALITIES STATISTICAL DATA ON USAGE, METHOD THEREFOR, AND APPARATUS APPLIED TO SAME

(71) Applicant: Korea Institute of Science & Technology Information, Daejeon (KR)

(72) Inventors: Young Im Jung, Daejeon (KR); Jay Hoon Kim, Daejeon (KR); Jeong Hwan Kim, Daejeon (KR); Ho Nam Choi, Daejeon (KR); Hwan Min Kim, Seoul (KR)

(73) Assignee: Korea Institute of Science & Technology Information, Daejeon (KR)

( * ) Notice: Subject to any disclaimer, the term of this patent is extended or adjusted under 35 U.S.C. 154(b) by 242 days.

(21) Appl. No.: 14/396,437

(22) PCT Filed: Dec. 12, 2013

(86) PCT No.: PCT/KR2013/011519
§ 371 (c)(1),
(2) Date: Oct. 23, 2014

(87) PCT Pub. No.: WO2014/104622
PCT Pub. Date: Jul. 3, 2014

(65) Prior Publication Data
US 2015/0106340 A1    Apr. 16, 2015

(30) Foreign Application Priority Data
Dec. 24, 2012  (KR) .................... 10-2012-0151949

(51) Int. Cl.
*G06F 17/30* (2006.01)
*G06Q 30/02* (2012.01)

(52) U.S. Cl.
CPC ... *G06F 17/30371* (2013.01); *G06Q 30/0201* (2013.01)

(58) Field of Classification Search
USPC ...................... 702/182; 725/2; 707/687, 688
See application file for complete search history.

(56) References Cited

U.S. PATENT DOCUMENTS 7,305,360 B1 * 12/2007 Lamoureux .......... G06Q 20/382
   705/26.1
8,751,414 B2 *  6/2014 Datta .................. G06F 11/0751
   706/11

(Continued)

FOREIGN PATENT DOCUMENTS

| JP | 2012068928 | 4/2012 |
| KR | 1020010045473 | 6/2001 |
| KR | 1020060024092 | 3/2006 |

OTHER PUBLICATIONS

International Search Report for PCT Application No. PCT/KR2013/011519 mailed Mar. 10, 2014.

*Primary Examiner* — Hung T Vy
(74) *Attorney, Agent, or Firm* — RatnerPrestia

(57) ABSTRACT

The present invention discloses a system for automatically detecting abnormalities in statistical data on usage, to a method for same, and to an apparatus applied to same. Namely, the present invention can increase the reliability and accuracy of statistical data on usage by: collecting statistical data on usage, the data relating to the usage of electronic information from a plurality of information-providing platform apparatuses each issuing separate electronic information; and, from among the collected statistical data on usage, determining, as data to be subjected to abnormal- (Continued)

ity detection, only the statistical data on usage that corresponds to a reference data format, and detecting abnormalities for each type from the statistical data on usage determined as the data to be subjected to abnormality detection.

20 Claims, 5 Drawing Sheets

(56) References Cited

U.S. PATENT DOCUMENTS

2005/0143953 A1* 6/2005 Retsina .............. G05B 23/0294
702/182
2008/0256567 A1* 10/2008 Butler ................ H04N 7/17318
725/2

* cited by examiner

SYSTEM FOR AUTOMATICALLY DETECTING ABNORMALITIES STATISTICAL DATA ON USAGE, METHOD THEREFOR, AND APPARATUS APPLIED TO SAME

CROSS REFERENCE TO RELATED APPLICATIONS

This application is the U.S. National Phase Application of PCT/KR2013/011519, filed Dec. 12, 2013, which claims priority to Korean Patent Application No. 10-2012-0151949, filed Dec. 24, 2012, the contents of such applications being incorporated by reference herein.

BACKGROUND OF THE INVENTION

1. Field of the Invention

The present disclosure relates to a method of detecting abnormalities for each type in statistical usage data on a large scale of electronic information collected from a plurality of information suppliers and transmitting a message related to the detected abnormalities to a manager.

2. Description of the Prior Art

The importance of the Internet has rapidly increased as a strategic tool for improving the efficiency and the productivity over all fields of industries and thus opportunities for new businesses are continuously created through the Internet and areas thereof are expanded.

While printed materials using paper such as news, magazines, books and the like have gradually regressed, electronic information services which digitalize the printed materials and users using the electronic information services have gradually increased.

Here, as a representative service example, the electronic information services includes a service in which an individual information supplier issues and provides periodic publications as electronic information in the form of electronic documents, such as theses, academic journals, magazines and the like.

Meanwhile, the information supplier which provides the electronic information service issues the electronic information as described above and also generates statistical usage data related to the use of the issued electronic information, so as to collect and use the statistical usage data.

Since the statistical usage data related to the use of the electronic information is data which can be used by various subjects, the statistical usage data requires accuracy. However, the statistical usage data is generated individually by each information supplier, so that the statistical usage data is highly likely to have various abnormalities (errors).

Accordingly, in order to increase the reliability of the statistical usage data related to the electronic information, an integrated method for verifying collected statistical usage data is required.

SUMMARY OF THE INVENTION

The present disclosure has been made to solve the above problems and an aspect of the present disclosure is to improve the reliability and accuracy of statistical usage data by detecting an abnormality for each type from statistical usage data on a large scale of electronic information collected from a plurality of information suppliers issuing the electronic information and transmitting a message related to the detected abnormality to a manager.

In accordance with a first aspect of the present disclosure, a system for automatically detecting an abnormality is provided. The system includes: a plurality of information supplier platform apparatuses configured to generate statistical usage data related to the use of electronic information; and an abnormality detection apparatus configured to collect the statistical usage data related to the use of the electronic information from the plurality of information supplier platform apparatuses, determine only statistical usage data that matches a standard data format among the collected statistical usage data as a target subject to abnormality detection, detect a predetermined abnormality for each type in the statistical usage data determined as the target subject to the abnormality detection, and generate a notification message for notifying of the detected abnormality for each type.

In accordance with a second aspect of the present disclosure, an apparatus for detecting an abnormality is provided. The apparatus includes: a detection target determination unit configured to determine only statistical usage data that matches a standard data format among statistical usage data related to the use of electronic information collected from a plurality of information supplier platform apparatuses issuing the electronic information as a target subject to abnormality detection; and an abnormality detection unit configured to detect a predetermined abnormality for each type from the statistical usage data determined as the target subject to the abnormality detection and notify of the detected abnormality for each type.

The apparatus may further include a message transmission unit configured to, when the collected statistical usage data does not match the standard data format or when the abnormality for each type is identified from the statistical usage data determined as the target subject to the abnormality detection, generate a notification message for notifying of a corresponding state and transmit the notification message to a corresponding information supplier platform apparatus.

The standard data format may include an Extensible Markup Language (XML) data format and the detection target determination unit determines only statistical usage data having a document standard defined in the XML data format as the target subject to the abnormality detection.

The statistical usage data may include at least one of identification information for identifying the statistical usage data of the electronic information collected from the plurality of information supplier platform apparatuses, statistical figure information on the use of the electronic information, and usage type information for identifying a usage type of the electronic information by a user.

The abnormality detection unit may identify whether there are two or more pieces of statistical usage data for electronic information collected from a particular information supplier platform apparatus based on the identification information, identify statistical figure information of each of the two or more pieces of statistical usage data when it is identified that there are two or more pieces of statistical usage data, and detect, as one of the abnormality for each type, a case where it is identified that pieces of statistical figure information of the two or more pieces of statistical usage data are different from each other.

The abnormality for each type may be detected based on an abnormality detection period designated to include two or more unit periods and the abnormality detection unit may identify whether a sum of statistical figure information in each of the two or more unit periods matches statistical figure information during the abnormality detection period and detect, as the abnormality for each type, a case where it is identified that the sum of the statistical figure information does not match the statistical figure information during the abnormality detection period.

The statistical figure information in the two or more unit periods may be divided based on the usage type information and the abnormality detection unit may identify whether a sum of the statistical figure information in each of the two or more unit periods divided based on the usage type information matches the statistical figure information during the abnormality detection period and detect, as the abnormality for each type, a case where each of the sums of the statistical figure information does not match the statistical figure information during the abnormality detection period.

The abnormality for each type may be detected based on a trend of a change in the statistical figure information in each of the two or more unit periods and the abnormality detection unit may identify a difference of the trend of the change in the statistical figure information in each of the two or more unit periods and detect, as the abnormality for each type, a case where it is identified that the difference of the trend of the change in statistical figure information in a particular unit period of the two or more unit periods is larger than or equal to a threshold.

The abnormality for each type may be detected based on a reference value designated in connection with the statistical figure information in each of the two or more unit periods and the abnormality detection unit may identify a difference between the statistical figure information in the two or more unit periods and the reference value and detect, as the abnormality for each type, a case where it is identified that the difference between the statistical figure information and the reference value is larger than or equal to a threshold.

In accordance with a third aspect of the present disclosure, a method of automatically detecting an abnormality is provided. The method includes: generating statistical usage data related to the use of electronic information by each of a plurality of information supplier platform apparatuses; collecting the statistical usage data related to the use of the electronic information from the plurality of information supplier platform apparatuses by an abnormality detection apparatus; determining only statistical usage data that matches a standard data format among the collected statistical usage data as a target subject to abnormality detection by the abnormality detection apparatus; detecting a predetermined abnormality for each type from the statistical usage data determined as the target subject to the abnormality detection by the abnormality detection apparatus; and generating a notification message for notifying of the detected abnormality for each type by the abnormality detection apparatus.

In accordance with a fourth aspect of the present disclosure, a method of automatically detecting an abnormality is provided. The method includes: collecting statistical usage data related to the use of electronic information from a plurality of information supplier platform apparatuses issuing the electronic information; determining only statistical usage data that matches a standard data format among the collected statistical usage data as a target subject to abnormality detection; and detecting a predetermined abnormality for each type from the statistical usage data determined as the target subject to the abnormality detection.

The method may further include, when the collected statistical usage data does not match the standard data format or when the abnormality for each type is identified from the statistical usage data determined as the target subject to the abnormality detection, generating a notification message for notifying of a corresponding state and transmitting the notification message to a corresponding information supplier platform apparatus.

The standard data format may include an Extensible Markup Language (XML) data format and the determining of only the statistical usage data that matches the standard data format among the collected statistical usage data as the target subject to the abnormality detection comprises determining only statistical usage data having a document standard defined in the XML data format as the target subject to the abnormality detection.

The statistical usage data may include at least one of identification information for identifying the statistical usage data of the electronic information collected from the plurality of information supplier platform apparatuses, statistical figure information on the use of the electronic information, and usage type information for identifying a usage type of the electronic information by a user.

The detecting of the predetermined abnormality for each type from the statistical usage data determined as the target subject to the abnormality detection may include identifying whether there are two or more pieces of statistical usage data for electronic information collected from a particular information supplier platform apparatus based on the identification information, identifying statistical figure information of each of the two or more pieces of statistical usage data when it is identified that there are two or more pieces of statistical usage data, and detecting, as one of the abnormality for each type, a case where it is identified that pieces of statistical figure information of the two or more pieces of statistical usage data are different from each other.

The abnormality for each type may be detected based on an abnormality detection period designated to include two or more unit periods and the detecting of the predetermined abnormality for each type from the statistical usage data determined as the target subject to the abnormality detection may include identifying whether a sum of statistical figure information in the two or more unit periods matches statistical figure information during the abnormality detection period and detecting, as the abnormality for each type, a case where it is identified that the sum of the statistical figure information does not match the statistical figure information during the abnormality detection period.

The statistical figure information in the two or more unit periods may be divided based on the usage type information and the detecting of the predetermined abnormality for each type from the statistical usage data determined as the target subject to the abnormality detection may include identifying whether each of sums of the statistical figure information in the two or more unit periods divided based on the usage type information matches the statistical figure information during the abnormality detection period and detecting, as the abnormality for each type, a case where each of the sums of the statistical figure information does not match the statistical figure information during the abnormality detection period.

The abnormality for each type may be detected based on a trend of a change in the statistical figure information in each of the two or more unit periods and the detecting of the predetermined abnormality for each type from the statistical usage data determined as the target subject to the abnormality detection may include identifying a difference of the trend of the change in the statistical figure information in each of the two or more unit periods and detecting, as the abnormality for each type, a case where it is identified that the difference of the trend of the change in statistical figure information in a particular unit period of the two or more unit periods is larger than or equal to a threshold.

The abnormality for each type may be detected based on a reference value designated in connection with the statistical figure information in each of the two or more unit periods and the detecting of the predetermined abnormality for each type from the statistical usage data determined as the target subject to the abnormality detection may include identifying a difference between the statistical figure information in the two or more unit periods and the reference value and detecting, as the abnormality for each type, a case where it is identified that the difference between the statistical figure information and the reference value is larger than or equal to a threshold.

According to a system for automatically detecting an abnormality of statistical usage data according to an embodiment of the present disclosure, a method thereof, and an apparatus applied thereto, it is possible to improve the reliability and accuracy of the statistical usage data by detecting abnormalities for each type in the statistical usage data on a large scale of electronic information collected from a plurality of information suppliers issuing the electronic information and generating and transmitting a message related to the detected abnormalities.

DETAILED DESCRIPTION OF THE EXEMPLARY EMBODIMENTS

Hereinafter, an embodiment of the present disclosure will be described with reference to the accompanying drawings.

Figure 1:
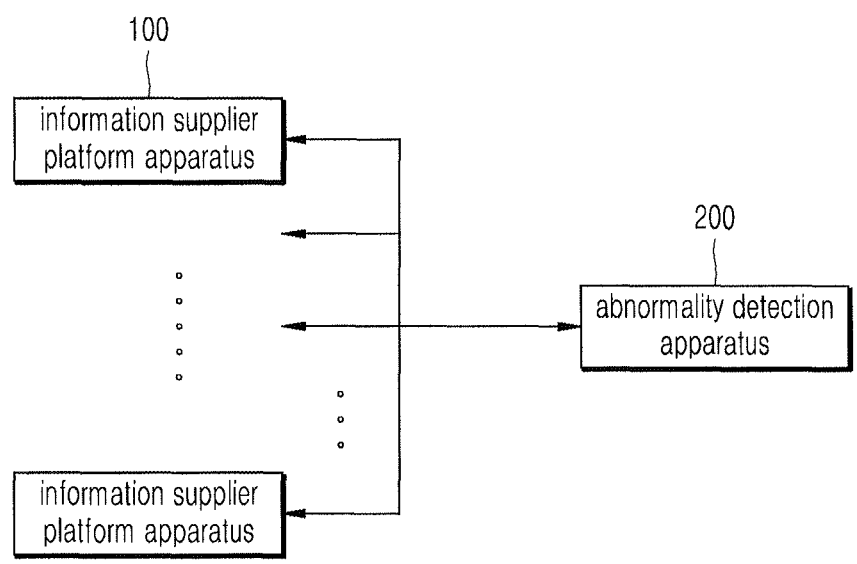
FIG. 1 illustrates a schematic configuration of an automatic abnormality detection system according to an embodiment of the present disclosure.

FIG. 1 illustrates an automatic abnormality detection system according to an embodiment of the present disclosure.

As illustrated in FIG. 1, the automatic abnormality detection system according to the embodiment of the present disclosure includes an information supplier platform apparatus 100 configured to generate statistical usage data according to the use of electronic information and an abnormality detection apparatus 200 configured to collect statistical usage data of the electronic information from a plurality of information supplier platform apparatuses 100 and detect abnormalities.

First, the information supplier platform apparatus 100 refers to a platform for distributing electronic information issued by an individual information supplier, and may distribute the issued electronic information to a user apparatus (not shown) so that a user can use the electronic information and have the form of a server that generates the statistical usage data corresponding to a usage result of the electronic information by the user.

Here, the electronic information refers to an electronic document issued by an individual information supplier and may correspond to, for example, periodic publications such as theses, academic journals, magazines and the like.

Further, the user apparatus refers to a user device for accessing the information supplier platform apparatus 100 to receive electronic information or receiving electronic information transmitted in the form of push (for example, an e-mail) from the information supplier platform apparatus 100.

For example, the user apparatus may correspond to a smart phone, a Personal Computer (PC), a notebook, a tablet PC, and a Personal Digital Assistant (PDA) or the like, and may not be limited thereto and include all of devices which can interwork with the information supplier platform apparatus 100.

Further, the abnormality detection apparatus 200 is a configuration for collecting statistical usage data generated by each of the information supplier platform apparatuses 100 and detecting abnormalities of collected large scale statistical usage data, and may have the form of a server which drives an algorithm for detecting the abnormalities.

Meanwhile, according to an embodiment of the present disclosure, the abnormality detection apparatus 200 collects statistical usage data of the electronic information generated by the plurality of information supplier platform apparatuses 100 and manages the large scale of statistical usage data.

Here, the statistical usage data of the electronic information refers to individually generated data sets which is individually generated as a distribution result of the electronic information by each of the information supplier platform apparatuses 100 as described above.

Then, when generating the statistical usage data of the electronic information, each of the information supplier platform apparatuses 100 does not apply in common a program or algorithm required for generating other data except for a standard data format.

Accordingly, although the statistical usage data related to the use of the electronic information is data requiring accuracy which is used by various subjects, the statistical usage data has low reliability since various abnormalities (errors) are contained as the statistical usage data is actually generated individually by each of the information supplier platform apparatuses 100.

Further, due to an increase in users subscribing to the electronic information, the statistical usage data of the electronic information is generated every month by various subjects and verification of such a large scale of statistical usage data may actually be impossible.

Accordingly, an embodiment of the present disclosure provides a method of detecting an abnormality for each type from statistical usage data related to a large scale of electronic information collected from the plurality of information supplier platform apparatuses 100 and notifies the detected abnormality to the manager, which will be described below in detail.

First, the information supplier platform apparatus 100 performs a function of generating statistical usage data related to the use of electronic information.

More specifically, the information supplier platform apparatus 100 distributes the issued electronic information to a user apparatus (not shown) so that the user can use the electronic information and generates the statistical usage data corresponding to a use result of the electronic information by the user at every predetermined period.

Here, the predetermined period refers to a generation period of the statistical usage data in the unit of years, quarters, months, weeks, or days, and may be variously made according to an operator's designation or vary depending on a collection period of the statistical usage data by the abnormality detection apparatus 200.

Further, the abnormality detection apparatus 200 performs a function of collecting statistical usage data from the plurality of information supplier platform apparatuses 100.

More specifically, the abnormality detection apparatus 200 collects the statistical usage data from each of the plurality of information supplier platform apparatuses 100 according to the generation period of the statistical usage data by the information supplier platform apparatus 100 or the collection period of the statistical usage data.

Here, the statistical usage data may include, for example, a name of the electronic information, identification information for distinguishing the statistical usage data of the electronic information, a name of an information supplier issuing the electronic information, identification information of the information supplier platform apparatus 100, statistical figure information on the use of the corresponding electronic information, and usage type information (for example, the use of a PDF or an HTML) for distinguishing usage types of the corresponding electronic information by the user.

Further, the abnormality detection apparatus 200 performs a function of determining only the statistical usage data, which matches a standard data format, among the collected statistical usage data as a target subject to the abnormality detection.

More specifically, the abnormality detection apparatus 200 identifies whether the collected statistical usage data is, for example, an Extensible Markup Language (XML) data format and determines only the statistical usage data having a document standard defined in the XML data format as the target subject to the abnormality detection.

Further, the abnormality detection apparatus 200 may perform a function of detecting an overlapping statistics abnormality from the statistical usage data determined as the target subject to the abnormality detection.

More specifically, when there is overlapping statistical usage data for the same electronic information issued by a particular information supplier platform apparatus 100 based on identification information of the statistical usage data determined as the target subject to the abnormality detection, the abnormality detection apparatus 200 stores only one set of usage statistic data and thus only one set of statistical usage data can be stored in a database with respect to one electronic information in accordance with each of the information supplier platform apparatuses 100.

At this time, the abnormality detection apparatus 200 identifies statistical figure information on each of the overlapping statistical usage information. When it is identified that respective overlapping statistical usage data have different statistical figure information, an overlapping statistics abnormality is detected.

Further, the abnormality detection apparatus 200 may perform a function of detecting an abnormality of statistical figure information on the statistical usage data having no overlapping statistics abnormality.

More specifically, when the overlapping statistics abnormality for the statistical usage data determined as the target subject to the abnormality detection is completed, the abnormality detection apparatus 200 detects a non-matching abnormality of the statistical figure information during an abnormality detection period per unit period by identifying the statistical figure information during the abnormality detection period divided into unit periods.

Further, the abnormality detection apparatus 200 may perform a function of detecting an abnormality by identifying trend of a change in the statistical figure information.

More specifically, the abnormality detection apparatus 200 may detect the abnormality when the trend of the change in the statistical figure information for the unit period has a difference larger than or equal to a threshold from trends of changes previously identified for the particular unit period by identifying the trends of the changes in the statistical figure information for each of the unit periods based on the statistical figure information divided according to the usage type information for each unit period.

Further, the abnormality detection apparatus 200 may perform a function of generating and transmitting a notification message to notify of a corresponding state when the abnormality is detected from the collected statistical usage data.

More specifically, when the collected statistical usage data does not match the standard data format or when the abnormality is detected from the statistical usage data determined as the target subject to the abnormality detection, the abnormality detection apparatus 200 generates a notification message (for example, an e-mail) for notifying of a corresponding state and transmits the generated notification message to a system manager or a person in charge of the corresponding information supplier platform apparatus 100.

Figure 2:
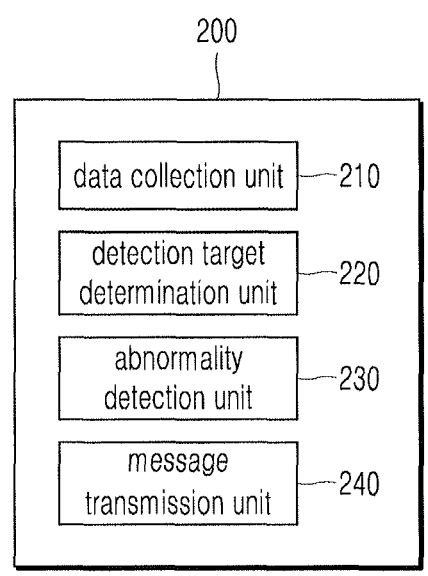
FIG. 2 illustrates a configuration of an abnormality detection apparatus according to an embodiment of the present disclosure.

Hereinafter a configuration of the abnormality detection apparatus 200 according to an embodiment of the present disclosure will be described in more detail with reference to FIG. 2.

That is, the abnormality detection apparatus 200 includes a data collection unit 210 configured to collect statistical usage data related to the use of electronic information from the plurality of information supplier platform apparatuses 100, a detection target determination unit 220 configured to determine a target subject to the abnormality detection among the collected statistical usage data, and an abnormality detection unit 230 configured to detect an abnormality for each type from the statistical usage data determined as the target subject to the abnormality detection.

Further, the abnormality detection apparatus 200 may further include a message transmission unit 240 configured to transmit a notification message for an abnormality state as well as the above described components.

Here, all or some of the configurations of the abnormality detection apparatus 200 including the data collection unit 210, the detection target determination unit 220, the abnormality detection unit 230, and the message transmission unit 240 may be implemented in the form of software module executed by a processor or implemented by hardware.

First, the data collection unit 210 performs a function of collecting statistical usage data from the plurality of information supplier platform apparatuses 100.

More specifically, the data collection unit 210 collects the statistical usage data from each of the plurality of information supplier platform apparatuses 100 according to a generation period of the statistical usage data by the information supplier platform apparatus 100 or a collection period of the statistical usage data.

Here, each of the plurality of information supplier platform apparatuses 100 distributes electronic information to a user apparatus (not shown) so that the user can use the electronic information and generates the statistical usage data corresponding to a use result of the electronic information by the user at every predetermined period. Accordingly, the statistical usage data can be collected.

Further, the detection target determination unit 220 performs a function of determining only the statistical usage data, which matches a standard data format, among the collected statistical usage data as a target subject to the abnormality detection.

More specifically, the detection target determination unit 220 identifies whether the collected statistical usage data is an Extensible Markup Language (XML) data format and determines only the statistical usage data having a document standard defined in the XML data format as the target subject to the abnormality detection.

At this time, the detection target determination unit 220 determines the target subject to the abnormality detection based on a Document Type Definition (DTD) document which is a document standard defined in the XML data format.

For example, the detection target determination unit 220 may determine only the statistical usage data having the data format which matches the reference defined in the DTD document by identifying a data format such as logical and physical structures of the document, a tag element type acceptable in the document, attributes assigned to each tag element, an entity acceptable in the document, a notation used together with an external entity and the like.

Further, the abnormality detection unit 230 performs a function of detecting an overlapping statistics abnormality from the statistical usage data determined as the target subject to the abnormality detection.

More specifically, the abnormality detection unit 230 may identify the overlapping statistics abnormality by determining whether there is overlapping statistical usage data for the same electronic information issued from the particular information supplier platform apparatus 100 based on identification information of the statistical usage data determined as the target subject to the abnormality detection.

For example, when the number of pieces of statistical usage data related to the same electronic device issued from the particular information supplier platform apparatus 100 is two or more, the abnormality detection unit 230 may store only one particular piece of statistical usage data among the two or more pieces of statistical usage data and thus store only one statistical usage data for one electronic information in the database in accordance with each of the information supplier platform apparatuses 100.

At this time, the abnormality detection unit 230 identifies statistical figure information on each of the two or more statistical usage data. When the identified pieces of statistical figure information are different from each other, the overlapping statistics abnormality is detected.

Further, the abnormality detection apparatus 230 may perform a function of detecting an abnormality of statistical figure information on the statistical usage data having no overlapping statistics abnormality.

More specifically, when the overlapping statistics abnormality for the statistical usage data determined as the target subject for the abnormality detection is completed, the abnormality detection unit 230 detects a non-matching abnormality of the statistical figure information during an abnormality detection period per unit period by identifying the statistical figure information during the abnormality detection period divided into the unit periods.

At this time, the abnormality detection unit 230 may detect, as the abnormality, a case where it is identified that a sum of the statistical figure information for respective unit periods does not match the statistical figure information during the abnormality detection period.

Figure 3:
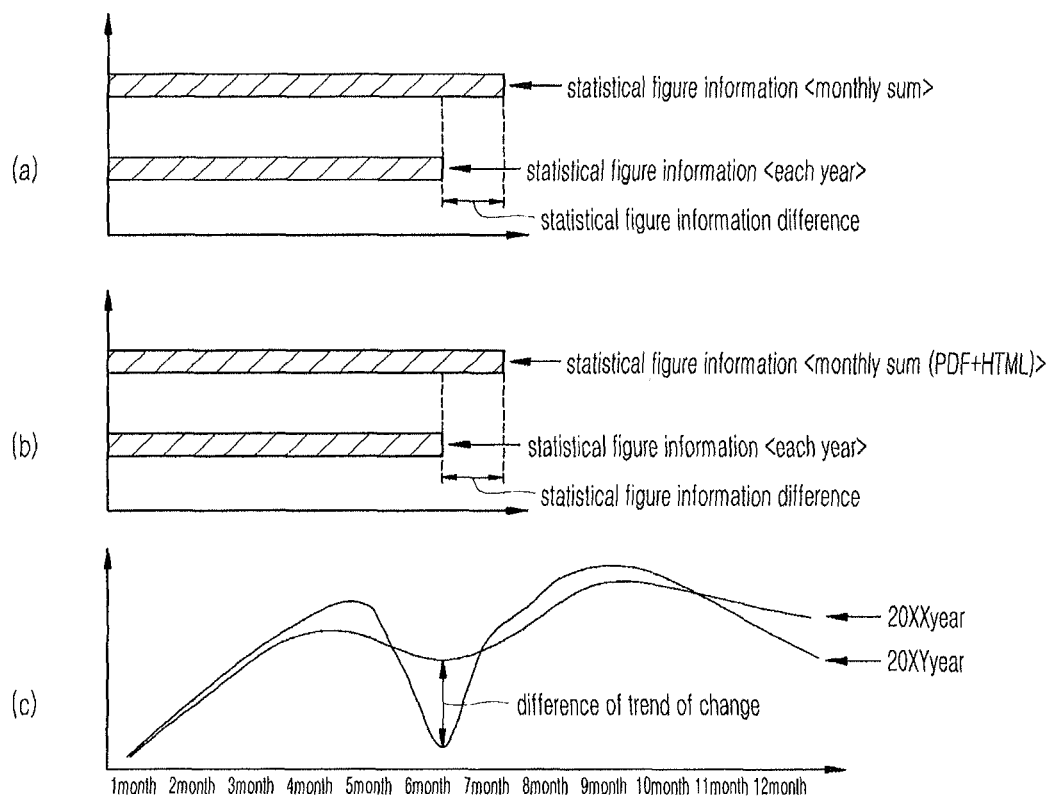
FIG. 3 is a view describing an operation of detecting abnormalities according to an embodiment of the present disclosure.

For example, as illustrated in FIG. 3A, when the abnormality detection period is determined as one year and each unit period is determined as every month of the corresponding year, a sum of monthly statistical figure information is compared to entire statistical figure information for one year. When it is identified that the sum of the monthly statistical figure information does not match the entire statistical figure information for one year, it is determined that an abnormality exists.

Further, the abnormality detection unit 230 may identify each of the pieces of statistical figure information divided according to the usage type information (for example, PDF or HTML) applied to the use of the electronic information for each unit period. When it is identified that a sum of the pieces of statistical figure information divided according to the usage type information for each unit period does not match statistical figure information for the abnormality detection period, it is determined as the abnormality.

For example, as illustrated in FIG. 3B, when the abnormality detection period is determined as one year and each unit period is determined as every month of the corresponding year, a sum of monthly statistical figure information using the electronic information of the PDF format and a sum of statistical figure information using the electronic information of the HTML format are compared to the entire statistical figure information for one year. When it is identified that the sum of the statistical figure information does not match the entire statistical figure information for one year, it is determined that an abnormality exists.

Further, the abnormality detection unit 230 may perform a function of detecting an abnormality by identifying trends of changes in the statistical figure information.

More specifically, the abnormality detection unit 230 may identify the trends of the changes in the statistical figure information for each unit period based on the statistical figure information divided according to the usage type information for each unit period and detect the abnormality when a difference between the trends of the changes in the statistical figure information for the unit period and the trend of a change previously identified for the particular unit period is larger than or equal to a threshold.

For example, as illustrated in FIG. 3C, when the abnormality detection period is determined as one year and each unit period is determined as every month of the corresponding year, if a different (increase/decrease) of the trend of the change in a particular month (June) from the previously month is larger than or equal to a threshold (for example, 100 times) through the identification of the trend of the change in the monthly statistical figure information of each year, the corresponding state may be determined as the abnormality.

Meanwhile, the abnormality detection unit 230 may detect the abnormality based on a reference value designated in relation to the statistical figure information as well as the above described detection method.

Here, the reference value designated in relation to the statistical figure information is for detecting whether the statistical figure information for each unit period goes beyond a normal range or shows an unusual use pattern and may correspond to an average value of the statistical figure information.

That is, the abnormality detection unit 230 compares the statistical figure information for each unit period and the designated reference value. When it is identified that a difference between the statistical figure information and the reference value is larger than or equal to a threshold, the abnormality detection unit 230 detects it as the abnormality which goes beyond the normal range or shows an unusual use pattern.

At this time, the abnormality detection unit 230 may employ, for example, a univariate outlier detection method, an outlier detection method with Local Outlier Factor (LOF), an outlier detection method by clustering, and an outlier detection method from time series data as a method of detecting the abnormality.

Here, the univariate outlier detection method refers to a method of automatically detecting a data value which can be considered as an outlier by expressing the distribution of univariate data in a graph by using a quantile plot and identifying how far the data is from a center of the data distribution, that is, through a position of the data beyond an Interquartile range.

Further, the outlier detection method with LOF refers to a method applied only to a figure variable, which inspects a density (concentration in one area) through a comparison with k pieces of neighboring data.

The outlier detection method by clustering refers to an abnormality detection method using a density-based clustering scheme or a k-means clustering scheme.

The outlier detection method from time series data refers to an abnormality detection method using Seasonal-Trend decomposition based on Loess (STL) and Auto-Regressive Moving Average model (ARIMA) for data beyond characteristics of time series data such as transitivity, seasonality, and circularity, characteristics.

Further, the message transmission unit 240 may perform a function of generating and transmitting a notification message to notify of a corresponding state when the abnormality is detected from the collected statistical usage data.

More specifically, when the collected statistical usage data does not match the standard data format or when the abnormality is detected from the statistical usage data determined as the target subject to the abnormality detection, the message transmission unit 240 generates a notification message (for example, an e-mail) for notifying of a corresponding status and transmits the generated notification message to a system manager or a person in charge of the corresponding information supplier platform apparatus 100.

As described above, according to the automatic abnormality detection system according to the embodiment of the present disclosure, it is possible to improve the reliability and accuracy of the statistical usage data by detecting an abnormality for each type from the statistical usage data on a large scale of electronic information collected from a plurality of information suppliers issuing the electronic information and generating and transmitting a message related to the detected abnormality.

Figure 4:
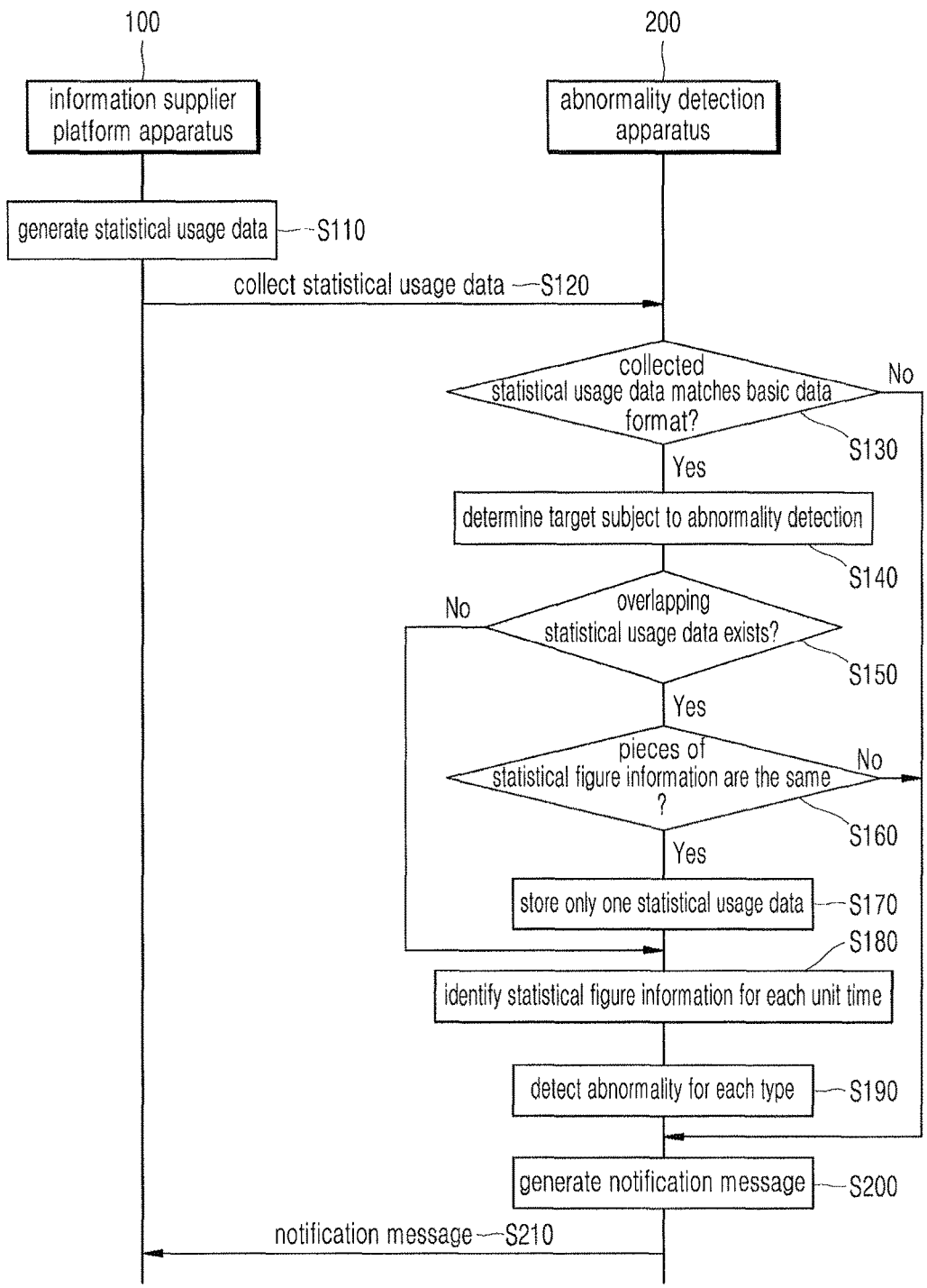
FIG. 4 is a flowchart schematically illustrating an operation flow in an automatic abnormality detection system according to an embodiment of the present disclosure.
Figure 5:
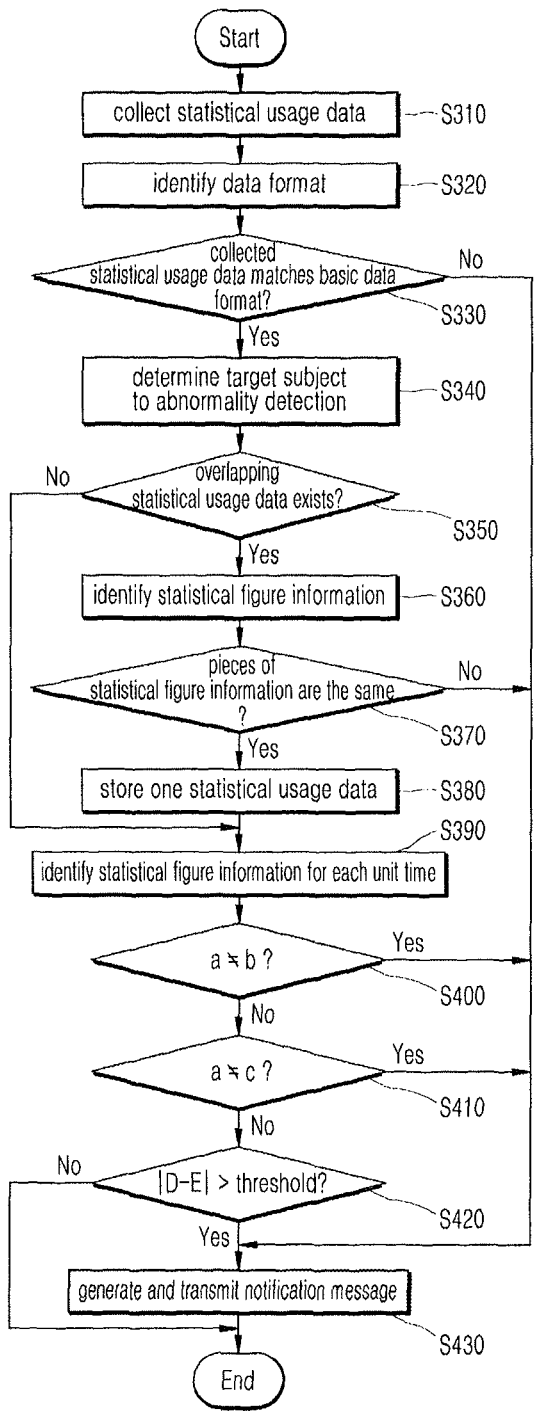
FIG. 5 is a flowchart schematically illustrating operations of an abnormality detection apparatus according to an embodiment of the present disclosure.

Hereinafter, an automatic abnormality detection method according to an embodiment of the present disclosure will be described with reference to FIGS. 4 and 5. Here, reference numerals of the configurations illustrated in FIGS. 1 to 3 will be referred to in order to describe configurations of FIG. 4 for convenience of the description.

First, an operation flow in the automatic abnormality detection system according to an embodiment of the present disclosure will be described with reference to FIG. 4.

The information supplier platform apparatus 100 distributes the issued electronic information to a user apparatus (not shown) so that the user can use the electronic information and generates the statistical usage data corresponding to a use result of the electronic information by the user at every predetermined period in step S110.

Then, the abnormality detection apparatus 200 collects the statistical usage data from each of a plurality of information supplier platform apparatuses 100 according to a generation period of the statistical usage data by each of the information supplier platform apparatuses 100 or a collection period of the statistical usage data in step S120.

Subsequently, the abnormality detection apparatus 200 identifies whether the collected statistical usage data is, for example, an Extensible Markup Language (XML) data format and determines only the statistical usage data having a document standard defined in the XML data format as a target subject to the abnormal detection in steps S130 to S140.

Next, when there is overlapping statistical usage data for the same electronic information issued by a particular information supplier platform apparatus 100 based on identification information of the statistical usage data determined as the target subject to the abnormality detection, the abnormality detection apparatus 200 stores only one piece usage statistic data and thus only one statistical usage data can be stored in a database with respect to one electronic information in accordance with each of the information supplier platform apparatuses 100 in steps S150 to S170.

At this time, the abnormality detection apparatus 200 identifies statistical figure information on each of the overlapping statistical usage information. When it is identified that respective overlapping statistical usage data have different statistical figure information, it is detected as the overlapping statistics abnormality.

Then, when the detection of the overlapping statistics abnormality for the statistical usage data determined as the target subject to the abnormality detection is completed, the abnormality detection apparatus 200 detects a non-matching abnormality of the statistical figure information during an abnormality detection period per unit period by identifying the statistical figure information during abnormality detection period divided into unit periods in steps S180 to S190.

At this time, the abnormality detection apparatus 200 may detect the abnormality when trends of changes in the statistical figure information during the unit period has a difference larger than or equal to a threshold from trends of changes previously identified during the particular unit period by identifying the trends of the changes in the statistical figure information during each of the unit periods based on the statistical figure information divided according to the usage type information for each unit period.

Thereafter, when the collected statistical usage data does not match the standard data format or when the abnormality is detected from the statistical usage data determined as the target subject to the abnormality detection, the abnormality detection apparatus 200 generates a notification message (for example, an e-mail) for notifying of a corresponding state and transmits the generated notification message to a system manager or a person in charge of the corresponding information supplier platform apparatus 100 in steps S200 to S210.

Hereinafter an operation method of the abnormality detection apparatus 200 according to an embodiment of the present disclosure will be described in detail with reference to FIG. 5.

The data collection unit 210 first collects the statistical usage data from each of the plurality of information supplier platform apparatuses 100 according to a generation period of the statistical usage data by each of the information supplier platform apparatuses 100 or a collection period of the statistical usage data in step S310.

At this time, each of the plurality of information supplier platform apparatuses 100 distributes electronic information to a user apparatus (not shown) so that the user can use the electronic information and generates the statistical usage data corresponding to a use result of the electronic information by the user at every predetermined period. Accordingly, the statistical usage data can be collected.

Then, the detection target determination unit 220 identifies whether the collected statistical usage data is an Extensible Markup Language (XML) data format and determines only the statistical usage data having a document standard defined in the XML data format as the target subject to the abnormal detection in steps S320 to S340.

At this time, the detection target determination unit 220 determines the target subject to the abnormality detection based on a Document Type Definition (DTD) document which is a document standard defined in the XML data format.

For example, the detection target determination unit 220 may determine only the statistical usage data having the data format which matches the reference defined in the DTD document by identifying a data format such as logical and physical structures of the document, a tag element type acceptable in the document, attributes assigned to each tag element, an entity acceptable in the document, a notation used together with an external entity and the like.

Then, the abnormality detection unit 230 may identify the overlapping statistics abnormality by determining whether there is overlapping statistical usage data for the same electronic information issued from the particular information supplier platform apparatus 100 based on identification information of the statistical usage data determined as the target subject to the abnormality detection in step S350.

At this time, when the number of pieces of statistical usage data related to the same electronic device issued from the particular information supplier platform apparatus 100 is two or more, the abnormality detection unit 230 may store only one particular piece of statistical usage data among the two or more pieces of statistical usage data and thus only one piece of statistical usage data can be stored in the database with respect to one electronic information in accordance with each of the information supplier platform apparatuses 100 in steps S360 to S380.

Here, the abnormality detection unit 230 identifies statistical figure information on each of the two or more statistical usage data. When the identified pieces of statistical figure information are different from each other, it is detected as the overlapping statistics abnormality.

Next, when the detection of the overlapping statistics abnormality for the statistical usage data determined as the target subject to the abnormality detection is completed, the abnormality detection unit 230 detects a non-matching abnormality of the statistical figures information during an abnormality detection period per unit period by identifying the statistical figures information during the abnormality detection period divided into the unit periods in step S390.

At this time, the abnormality detection unit 230 may detect, as the abnormality, a case where it is identified that a sum (b) of the statistical figure information for respective unit periods does not match the statistical figure information (a) during the abnormality detection period in step S400.

Further, the abnormality detection unit 230 identifies the statistical figure information divided according to the usage type information for each unit period and detects, as the abnormality, a case where it is identified that a sum (c) of the statistical figure information divided according to the usage type information (PDF or HTML) for each unit period does not match statistical figure information (a) during the abnormality detection period in step S410.

In addition, the abnormality detection unit 230 identifies the trends of the changes in the statistical figure information during each of the unit periods based on the statistical figure information divided according to the usage type information for each unit period and detects, as the abnormality, a case where trends of changes (D) in the statistical figure information during the unit period has a difference larger than or equal to a threshold from trend of a change (E) previously identified during the particular unit period in step S420.

Meanwhile, the abnormality detection unit 230 compares the statistical figure information for each unit period and a reference value designated in relation to the statistical figure information. When it is identified that a difference between the statistical figure information and the reference value is larger than or equal to a threshold, the abnormality detection unit 230 detects it as the abnormality which goes beyond a normal range or shows an unusual use pattern.

Thereafter, when the collected statistical usage data does not match the standard data format or when the abnormality is detected from the statistical usage data determined as the target subject to the abnormality detection, the message transmission unit 240 generates a notification message (for example, an e-mail) for notifying of a corresponding status and transmits the generated notification message to a system manager or a person in charge of the corresponding information supplier platform apparatus 100 in step S430.

As described above, according to the automatic abnormality detection method according to the embodiment of the present disclosure, it is possible to improve the reliability and accuracy of the statistical usage data by detecting abnormalities for each type from the statistical usage data on a large scale of electronic information collected from a plurality of information suppliers issuing the electronic information and generating and transmitting a message related to the detected abnormality.

Meanwhile, the method or algorithm steps described in connection with the embodiments disclosed herein may be directly implemented by hardware, a software module executed by a processor, or a combination thereof. The software module may be located in a Random Access Memory (RAM), a flash memory, a Read Only Memory (ROM), an Erasable Programmable ROM (EPROM), an Electrically EPROM (EEPROM), registers, a hard disc, a removable disc, a Compact Disc (CD)-ROM, or a technically known storage medium having another predetermined type. Examples of the storage medium may be connected with a processor, and accordingly, the process may read information from the storage medium and record information in the storage medium. Alternatively, the storage medium may be integrated into the processor. The processor and the storage medium may be included within an Application Specific Integrated Circuit (ASIC). The ASIC may be included within a user terminal. Alternatively, the processor and the storage medium may be included within the user terminal as individual components.

Although the present disclosure has been described in detail with reference to exemplary embodiments, the present disclosure is not limited thereto and it is apparent to those skilled in the art that various modifications and changes can be made thereto without departing from the scope of the present disclosure.

INDUSTRIAL APPLICABILITY

According to a system for automatically detecting abnormalities of statistical usage data according to an embodiment of the present disclosure, a method thereof, and an apparatus applied thereto, the present disclosure is highly applicable to the industries since, as the present disclosure passes the limit of the conventional technologies, related technologies of the present disclosure can be used and also the device to which the present disclosure is applied has a high probability of entering into the market and being sold, and thus the present disclosure can be obviously implemented in reality in that abnormalities for each type are detected in statistical usage data on a large scale of electronic information collected from a plurality of information suppliers issuing the electronic information and a message related to the detected abnormality is transmitted to a manager.

What is claimed is:

1. A system for automatically detecting an abnormality, the system comprising:
    a plurality of information supplier platform servers configured to generate statistical usage data related to the use of web-based electronic information downloaded to personal computing devices of users; and
    an abnormality detection server configured to:
        collect the statistical usage data related to the use of the web-based electronic information from the plurality of information supplier platform servers,
        determine statistical usage data that matches a standard data file format among the collected statistical usage data as a target subject to abnormality detection,
        determine if there is overlapping statistical usage data:
            if there is overlapping statistical usage data that are the same, store one of the overlapping statistical usage data, and
            if there is no overlapping statistical usage data, store the statistical usage data,
        detect a predetermined abnormality for each type in the statistical usage data determined as the target subject to the abnormality detection,
        generate a notification message including an email or text message for notifying of the detected abnormality for each type, and
        transmit the notification message to a selected one of the plurality of supplier platform servers.

2. An abnormality detection server for detecting an abnormality, the abnormality detection server comprising:
    a detection target determination unit configured to determine statistical usage data that matches a standard data file format among statistical usage data related to the use of web-based electronic information by personal computing devices of users, the statistical usage data downloaded from a plurality of information supplier platform servers issuing the web-based electronic information as a target subject to abnormality detection; and
    an abnormality detection unit configured to:
        determine if there is overlapping statistical usage data:
            if there is overlapping statistical usage data that are the same, store one of the overlapping statistical usage data, and
            if there is no overlapping statistical usage data, store the statistical usage data,
        detect a predetermined abnormality for each type from the statistical usage data determined as the target subject to the abnormality detection,
        generate a notification message including an email or text message for notifying of the detected abnormality for each type, and
        transmit the notification message to a selected one of the plurality of supplier platform servers.

3. The apparatus of claim 2, further comprising a message transmission unit configured to, when the collected statistical usage data does not match the standard data format or when the abnormality for each type is identified from the statistical usage data determined as the target subject to the abnormality detection, generate a notification message for notifying of a corresponding state and transmit the notification message to a corresponding information supplier platform apparatus.

4. The apparatus of claim 2, wherein the standard data format includes an Extensible Markup Language (XML) data format and the detection target determination unit determines statistical usage data having a document standard defined in the XML data format as the target subject to the abnormality detection.

5. The apparatus of claim 2, wherein the statistical usage data includes at least one of identification information for identifying the statistical usage data of the electronic information collected from the plurality of information supplier platform apparatuses, statistical figure information on the use of the electronic information, and usage type information for identifying a usage type of the electronic information by a user.

6. The apparatus of claim 5, wherein the abnormality detection unit identifies whether there are two or more statistical usage data for electronic information collected from a particular information supplier platform apparatus based on the identification information, identifies statistical figure information of each of the two or more statistical usage data when it is identified that there are two or more statistical usage data, and detects, as one of the abnormality for each type, a case where it is identified that statistical figure information of the two or more statistical usage data are different from each other.

7. The apparatus of claim 6, wherein the abnormality for each type is detected based on an abnormality detection period designated to include two or more unit periods and the abnormality detection unit identifies whether a sum of statistical figure information in each of the two or more unit periods matches statistical figure information during the abnormality detection period and detects, as the abnormality for each type, a case where it is identified that the sum of the statistical figure information in each of the two or more unit periods does not match the statistical figure information during the abnormality detection period.

8. The apparatus of claim 7, wherein the statistical figure information in the two or more unit periods is divided based on the usage type information and the abnormality detection unit identifies whether a sum of the statistical figure information in each of the two or more unit periods divided based on the usage type information matches the statistical figure information during the abnormality detection period and detects, as the abnormality for each type, a case where each of the sums of the statistical figure information does not match the statistical figure information during the abnormality detection period.

9. The apparatus of claim 7, wherein the abnormality for each type is detected based on a trend of a change in the statistical figure information in each of the two or more unit periods and the abnormality detection unit identifies a difference of the trend of the change in the statistical figure information in each of the two or more unit periods and detects, as the abnormality for each type, a case where it is identified that the difference of the trend of the change in statistical figure information in a particular unit period of the two or more unit periods is larger than or equal to a threshold.

10. The apparatus of claim 7, wherein the abnormality for each type is detected based on a reference value designated in connection with the statistical figure information in each of the two or more unit periods and the abnormality detection unit identifies a difference between the statistical figure information in the two or more unit periods and the reference value and detects, as the abnormality for each type, a case where it is identified that the difference between the statistical figure information and the reference value is larger than or equal to a threshold.

11. A method of automatically detecting an abnormality, the method comprising:
generating, by a plurality of information supplier platform servers, statistical usage data related to the use of web-based electronic information by personal computing devices of users,
collecting, by an abnormality detection server, the statistical usage data related to the use of the web-based electronic information from the plurality of information supplier platform servers;
determining, by the abnormality detection server, statistical usage data that matches a standard data file format among the collected statistical usage data as a target subject to abnormality detection;
determining, by the abnormality detection server if there is overlapping statistical usage data:
if there is overlapping statistical usage data that are the same, store one of the overlapping statistical usage data, and
if there is no overlapping statistical usage data, store the statistical usage data;
detecting, by the abnormality detection server, a predetermined abnormality for each type from the statistical usage data determined as the target subject to the abnormality detection;
generating, by the abnormality detection server, a notification message including an email or text message for notifying of the detected abnormality for each type; and
transmitting, by the abnormality detection server, the notification message to a selected one of the plurality of supplier platform servers.

12. A method of automatically detecting an abnormality, the method comprising:
collecting, by an abnormality detection server, statistical usage data related to the use of web-based electronic information by personal computing devices of users, the statistical usage data downloaded from a plurality of information supplier platform servers issuing the web-based electronic information;
determining, by the abnormality detection server, statistical usage data that matches a standard data file format among the collected statistical usage data as a target subject to abnormality detection;
determining, by the abnormality detection server if there is overlapping statistical usage data:
if there is overlapping statistical usage data that are the same, store one of the overlapping statistical usage data, and
if there is no overlapping statistical usage data, store the statistical usage data;
detecting, by the abnormality detection server, a predetermined abnormality for each type from the statistical usage data determined as the target subject to the abnormality detection;
generating, by the abnormality detection server, a notification message including an email or text message for notifying of the detected abnormality for each type; and
transmitting, by the abnormality detection server, the notification message to a selected one of the plurality of supplier platform servers.

13. The method of claim 12, further comprising, when the collected statistical usage data does not match the standard data format or when the abnormality for each type is identified from the statistical usage data determined as the target subject to the abnormality detection, generating a notification message for notifying of a corresponding state and transmitting the notification message to a corresponding information supplier platform apparatus.

14. The method of claim 12, wherein the standard data format includes an Extensible Markup Language (XML) data format and the determining of the statistical usage data that matches the standard data format among the collected statistical usage data as the target subject to the abnormality detection comprises determining statistical usage data having a document standard defined in the XML data format as the target subject to the abnormality detection.

15. The method of claim 12, wherein the statistical usage data includes at least one of identification information for identifying the statistical usage data of the electronic information collected from the plurality of information supplier platform apparatuses, statistical figure information on the use of the electronic information, and usage type information for identifying a usage type of the electronic information by a user.

16. The method of claim 15, wherein the detecting of the predetermined abnormality for each type from the statistical usage data determined as the target subject to the abnormality detection comprises identifying whether there are two or more statistical usage data for electronic information collected from a particular information supplier platform apparatus based on the identification information, identifying statistical figure information of each of the two or more statistical usage data when it is identified that there are two or more statistical usage data, and detecting, as one of the abnormality for each type, a case where it is identified that statistical figure information of the two or more statistical usage data are different from each other.

17. The method of claim 16, wherein the abnormality for each type is detected based on an abnormality detection period designated to include two or more unit periods and the detecting of the predetermined abnormality for each type from the statistical usage data determined as the target subject to the abnormality detection comprises identifying whether a sum of statistical figure information in the two or more unit periods matches statistical figure information during the abnormality detection period and detecting, as the abnormality for each type, a case where it is identified that the sum of the statistical figure information does not match the statistical figure information during the abnormality detection period.

18. The method of claim 17, wherein the statistical figure information in the two or more unit periods is divided based on the usage type information and the detecting of the predetermined abnormality for each type from the statistical usage data determined as the target subject to the abnormality detection comprises identifying whether each of sums of the statistical figure information in the two or more unit periods divided based on the usage type information matches the statistical figure information during the abnormality detection period and detecting, as the abnormality for each type, a case where each of the sums of the statistical figure information does not match the statistical figure information during the abnormality detection period.

19. The method of claim 17, wherein the abnormality for each type is detected based on a trend of a change in the statistical figure information in each of the two or more unit periods and the detecting of the predetermined abnormality for each type from the statistical usage data determined as the target subject to the abnormality detection comprises identifying a difference of the trend of the change in the statistical figure information in each of the two or more unit periods and detecting, as the abnormality for each type, a case where it is identified that the difference of the trend of the change in statistical figure information in a particular unit period of the two or more unit periods is larger than or equal to a threshold.

20. The method of claim 17, wherein the abnormality for each type is detected based on a reference value designated in connection with the statistical figure information in each of the two or more unit periods and the detecting of the predetermined abnormality for each type from the statistical usage data determined as the target subject to the abnormality detection comprises identifying a difference between the statistical figure information in the two or more unit periods and the reference value and detecting, as the abnormality for each type, a case where it is identified that the difference between the statistical figure information and the reference value is larger than or equal to a threshold.

\* \* \* \* \*